(12) United States Patent
Heubach

(10) Patent No.: US 11,808,312 B2
(45) Date of Patent: Nov. 7, 2023

(54) CAGE FREEWHEEL

(71) Applicant: RINGSPANN GmbH, Bad Homburg (DE)

(72) Inventor: Thomas Heubach, Usingen (DE)

(73) Assignee: RINGSPANN GmbH, Bad Homburg (DE)

( * ) Notice: Subject to any disclaimer, the term of this patent is extended or adjusted under 35 U.S.C. 154(b) by 0 days.

(21) Appl. No.: 17/875,542

(22) Filed: Jul. 28, 2022

(65) Prior Publication Data

US 2023/0058799 A1  Feb. 23, 2023

(30) Foreign Application Priority Data

Aug. 17, 2021 (DE) .......................... 102021121373.8
Jun. 8, 2022 (DE) .......................... 102022114386.4

(51) Int. Cl.
*F16D 41/067* (2006.01)

(52) U.S. Cl.
CPC .................................. *F16D 41/067* (2013.01)

(58) Field of Classification Search
CPC ......... F16D 41/067; F16D 41/07; F16D 41/28
See application file for complete search history.

(56) References Cited

U.S. PATENT DOCUMENTS

| | | | |
|---|---|---|---|
| 4,236,619 A | 12/1980 | Kuroda | |
| 6,044,947 A * | 4/2000 | Kinoshita | F16D 41/07 |
| | | | 192/41 A |

FOREIGN PATENT DOCUMENTS

| | | |
|---|---|---|
| DE | 1132390 B | 6/1962 |
| DE | 1286343 B | 1/1969 |
| DE | 2352820 A1 | 5/1974 |
| DE | 28 46 718 A1 | 5/1979 |
| DE | 3115779 A1 | 11/1982 |
| DE | 3612046 A1 | 10/1987 |
| DE | 19856505 A1 | 6/2000 |
| DE | 60103257 T2 | 5/2005 |
| DE | 102005018244 A1 | 11/2005 |
| DE | 102006004491 | 8/2007 |
| DE | 102007049050 A1 | 4/2009 |
| DE | 102009030614 | 2/2010 |
| DE | 102011108413 | 4/2012 |
| DE | 10 2011 016 995 A1 | 10/2012 |

(Continued)

OTHER PUBLICATIONS

German Office Action dated Aug. 2, 2022 for German Patent Application No. DE 10 2022 114 386.4.

(Continued)

*Primary Examiner* — Huan Le
(74) *Attorney, Agent, or Firm* — Volpe Koenig

(57) ABSTRACT

A cage freewheel for installing in the clamping gap between a shaft and a hub, in particular in the drive of an e-bike, having a sprag cage which, in one embodiment, is fitted continuously in the circumferential direction with sprags arranged pivotably in the sprag cage, with the sprags being loaded resiliently in the engagement direction. Here, a bearing disk is arranged axially adjacent to the sprag cage. In a further embodiment, the cage ring is fitted consecutively in the circumferential direction both with bearing rollers and with sprags. In addition, a shaft and hub arrangement and to an e-bike drive having a cage freewheel with the above-mentioned features is also provided.

24 Claims, 18 Drawing Sheets

(56) References Cited

FOREIGN PATENT DOCUMENTS

| | | |
|---|---|---|
| DE | 102011089559 A1 | 6/2013 |
| DE | 102014203827 A1 | 9/2015 |
| DE | 102014009833 A1 | 1/2016 |
| DE | 102016120544 A1 | 5/2018 |
| DE | 102017104682 A1 | 9/2018 |
| DE | 102017124019 A1 | 4/2019 |
| DE | 102018128663 A1 | 5/2020 |
| DE | 102019118475 A1 | 1/2021 |
| DE | 102019218785 | 6/2021 |
| FR | 2618196 A1 | 1/1989 |

OTHER PUBLICATIONS

German Office Action dated May 10, 2023 for German Patent Application No. 10 2021 121 373.8.

\* cited by examiner

CAGE FREEWHEEL

INCORPORATION BY REFERENCE

The following documents are incorporated herein by reference as if fully set forth: German Patent Application No. 10 2021 121 373.8, filed Aug. 17, 2021, and German Patent Application No. 10 2022 114 386.4, filed Jun. 8, 2022.

TECHNICAL FIELD

The invention relates to a cage freewheel for installing in the clamping gap between a shaft and a hub, in particular in the drive of an e-bike, having a sprag cage which is fitted in the circumferential direction with sprags arranged pivotably in the sprag cage, the sprags being loaded resiliently in the engagement direction.

BACKGROUND

Cage freewheels are known in numerous embodiments, see, for example, DE 10 2009 030 614 and DE 10 2011 108 413 by the same applicant. A cage ring having the features mentioned at the beginning is disclosed in DE 10 2019 218 785 A1.

In principle, freewheels require an external radial and axial mounting since their function is ensured only by the correct alignment of the sprags. For a tilt-free mounting of a shaft in relation to a hub, shaft and hub have to be mounted against each other at two bearing points. If a cage freewheel is installed in the clamping gap between a shaft and a hub, a plain bearing or rolling contact bearing is conventionally arranged on both sides of the cage freewheel in order to ensure the reliable functioning of the freewheel. Depending on the load design of the components, this leads to a correspondingly large axial overall size. In addition, three separate components, two bearings and a freewheel are required.

Over the course of developing e-bike drives, it has been found that conventional freewheels and the external rolling contact bearings or plain bearings required for the mounting require a considerable amount of installation space. This is undesirable since the distance between the pedals in comparison to a conventional bicycle or the axial construction space of the drive housing is thereby increased. Taking this as the starting point, the present invention is based on the object of developing a sprag cage freewheel which permits a shaft/hub connection which is as compact as possible in the axial direction.

SUMMARY

According to the invention, this object is achieved in the case of a cage freewheel of the type mentioned at the beginning in that a bearing disk is arranged axially adjacent to the sprag cage. The outside and inside diameter of the bearing disk correspond here, minus bearing tolerances, to the nominal size of the bearing gap, and therefore the bearing disk acts as a plain bearing between shaft component and hub component. The bearing disk thereby makes it possible to install the cage freewheel in a shaft/hub connection with a mounting which is only on one side and is separate from the freewheel, since the bearing disk, which is preferably located on that side of the freewheel which is opposite the external rolling contact bearing, forms a second bearing point and thus prevents the shaft from tilting in relation to the hub despite the use of only one rolling contact bearing. By saving on a second rolling contact bearing, the shaft/hub connection can therefore be constructed more compactly axially, which also leads to a cost-effective and robust construction.

In a first embodiment, the annular sprag cage is fitted continuously in the circumferential direction with sprags which are inserted into corresponding recesses or pockets of the sprag cage. The invention therefore follows a different route than, for example, DE 10 2019 218 785 A1 which proposes a freewheel, which is combined with a rolling contact bearing, for use in an e-bike drive, in which sprags and bearing rollers are used consecutively in the circumferential direction. By means of the, according to the invention, continuous fitting with sprags in the circumferential direction, a larger clamping surface in total is available, and therefore the freewheel with the same dimensioning can be designed for higher loads or, with the same load design, can be of smaller dimensions than a combined freewheel fitted consequentially with bearing rollers and sprags.

The bearing disk in combination with a separate rolling contact bearing arranged on one side of the freewheel widens the supporting surface between shaft part and hub part and therefore makes the freewheel stiffer in relation to tilting forces which occur, for example, in the case of the mounting of a helically toothed gearwheel as hub part, as is typically used in an e-bike drive.

In an advantageous refinement, the bearing disk is connected to the sprag cage via a latching connection intermeshing in a form-fitting manner at least in sections. Bearing disk and sprag cage can therefore be manufactured separately and connected in a simple manner via the latching connection. An advantage of this embodiment is the possibility of manufacturing the bearing disk and the sprag cage from different material adapted as best as possible to the respective function, e.g. the cage from an elastic plastic, such as polyamide or polyetheretherketone (PEEK) and the bearing disk from a suitable metal, such as brass or hardened steel.

In a further advantageous refinement, the bearing disk is rotatable in relation to the sprag cage, but is locked in the axial direction. This is especially advantageous because, when the sprags are set upright in the blocking direction in relation to the contact surfaces which are blocked against one another, the freewheel cage executes a relative rotation counter to the pivoting movement of the sprags. By means of the bearing disk which is rotatable in relation to the freewheel cage, the relative rotation is therefore not transmitted to the bearing disk, and therefore the bearing disk can be held in a rotationally fixed manner in relation to one of the contact surfaces.

A person skilled in the art has various possibilities for the structural design of the latching connection of the sprag cage and the bearing disk, the latching connection intermeshing in a form-fitting manner at least in sections. The latching connection can thus have a dovetail-like, hook-shaped or mushroom-shaped latching profile running in the circumferential direction.

It is particularly advantageous structurally if the latching profile is designed as a concentric and continuous ring, or ring which is interrupted in sections. It is likewise particularly advantageous structurally if the latching connection has a recess which is formed in the bearing disk and runs continuously in the circumferential direction of the bearing disk or is segmented in the circumferential direction. For example, the recess can have three sections each of 60° which are distributed over the circumference of the bearing disk.

In principle, it is expedient that the latching profile is formed on the sprag cage and grips behind a recess of the bearing disk radially from the inside outward.

The axial fixing of the bearing disk can be undertaken at the shaft or the hub, with it being freely rotatable in relation to the other part, for example in the form of a plain bearing or by interconnection of a rolling contact bearing.

It is likewise expedient in principle to design the bearing disk as a plain bearing, in particular as a radial plain bearing, preferably as a combination of radial plain bearing and axial plain bearing.

The sprags are preferably arranged captively in the sprag cage, optionally with the interconnection of elastic holding elements. The user thereby obtains an assembly which can simply be pushed into the annular gap between shaft and hub. The axial locking of the bearing disk can be produced by a press fit on the shaft or hub or by a screw connection.

The invention also relates to a shaft and hub arrangement with a hub, a shaft which is rotatable relative thereto, and a cage freewheel, which is arranged in a clamping gap between shaft and hub, of the abovementioned type, wherein on one side adjacent to the cage freewheel there is a rolling contact bearing which is designed as a radial bearing and via which shaft and hub are mounted against each other. By this design of a shaft and hub arrangement, the overall length thereof in the axial direction is reduced in comparison to a construction having rolling contact bearings arranged on both sides of the freewheel and, accordingly, in particular in an arrangement of an e-bike, the crankset or the drive housing can be constructed in narrower form in the axial direction.

It is particularly advantageous structurally if the freewheel cage lies axially on the rolling contact bearing, preferably on its side facing away from the bearing disk. However, an arrangement in which the bearing disk lies axially on the rolling contact bearing is also possible.

It is likewise possible to clip the two bearing points to the cage in a form-fitting manner.

It is likewise particularly advantageous structurally if the bearing disk of the cage freewheel is fixed to the shaft or hub and is rotatable in relation to the respective other part.

In a second embodiment, it is provided that the freewheel cage of the cage freewheel, which is in the form of a cage ring, is fitted in the circumferential direction both with sprags and with bearing rollers. A roller bearing is therefore integrated in the sprag freewheel, and therefore an additional rolling contact bearing in the annular gap between shaft part and hub part can be dispensed with. A sprag freewheel, in which sprags and bearing rollers are arranged in an alternating manner in the circumferential direction in a common freewheel cage, is disclosed in DE 10 2019 218 785 A1 and DE 10 2006 004 491 A1.

According to the invention, the freewheel cage according to the second embodiment has at least one axially projecting protrusion which engages in a form-fitting manner in an axially adjacent bearing disk fixed in the axial direction, and is rotatable in relation thereto, but is locked in the axial direction. The freewheel cage is then freely rotatable relative to the bearing disk.

The object is thereby achieved of developing a particularly compact sprag cage freewheel which, while having a high performance density, also takes on the correct mounting of the machine part which is fastened thereto and which is therefore capable of absorbing radial, axial and tilting forces which occur. In addition, the novel construction is distinguished by high operational reliability and advantageous production costs.

The invention therefore combines a cage which is fitted with sprags and bearing rollers and has a radial/axial plain bearing, and therefore it does not require any further axial securing of the cage freewheel. As a result, a considerable saving on construction space ensues.

The bearing disk not only brings about axial fixing of the cage freewheel in the clamping gap between a shaft part and a hub part, but also widens the supporting surface between shaft part and hub part and therefore makes the freewheel stiffer in relation to the tilting forces which occur, for example, in the mounting of a helically toothed gearwheel as hub part, as is typically used in an e-bike drive.

A person skilled in the art has various possibilities for the structural design of the axial protrusion of the freewheel cage. Said protrusion can thus have a dovetail-like, hook-shaped or mushroom-shaped cross section with which it grips radially behind a corresponding recess of the bearing disk. There is also a kinetic reversal between protrusion and bearing disk within the scope of the invention, for example by the bearing disk having a protrusion which grips behind a recess in the freewheel cage.

It is particularly advantageous structurally if the at least one axial protrusion of the freewheel cage is designed as a concentrically continuous ring, or ring which is interrupted in sections, e.g. a slotted ring. The recess, which is provided with an undercut and is gripped from behind, in the bearing disk can be designed to be continuous (i.e. not interrupted) in the circumferential direction. For manufacturing reasons, in particular if the bearing disk is manufactured as a sintered part or as an injection molded part, it may be advantageous, however, if the recess on the bearing disk is likewise segmented. For example, the recess can have three sections of 60° each which are distributed over the circumference of the bearing disk. Such a design facilitates the removal of the undercut regions from the production mold.

In principle, it is expedient that the axial protrusion of the freewheel cage grips behind the recesses in the bearing disk radially from the inside outward. This facilitates the possibility of bringing about the gripping from behind by an elastic snap-fit action, in particular if the freewheel cage is composed of plastic or is designed as a ring which is not closed. The alternative variant, in which the axial protrusion of the freewheel cage grips behind the recesses in the bearing disk radially from the outside inward, i.e. that part of the protrusion which latches in the recess points outward, is equally possible and covered by the invention. This can afford advantages in terms of manufacturing.

The axial fixing of the bearing disk can be undertaken on the shaft part or on the hub part, with it being freely rotatable in rotation to the other part, for example in the form of a plain bearing or by interconnection of a rolling contact bearing.

With regard to the spring loading of the sprags in the engagement direction, it has proven particularly advantageous for this purpose to use a spring ring which is arranged concentrically with respect to the freewheel cage and loads the sprags in the engagement direction by means of elastic spring tongues.

The sprags and the bearing rollers are preferably mounted captively in the freewheel cage, optionally with the interposition of elastic holding elements, and expediently together with the bearing disk used for the axial support. The user thereby obtains an assembly which can simply be pushed into the annular gap between shaft and hub. The axial locking of the bearing disk can be produced by a press fit on the shaft or hub or by a screw connection.

Finally, within the scope of the invention, the freewheel cage has a concentric supporting ring which serves for additionally mounting the sprags and the bearing rollers. Freewheel cage and supporting ring therefore form a two-part freewheel cage. The two-part cage firstly prevents a spring ring, which in each case spring mounts the sprags and is preferably designed as a sheet metal punched part, from being able to bend up if it is open, i.e. is unconnected at the butt joint in the circumferential direction. Secondly, the two-part cage, if namely freewheel cage and supporting ring are not rigidly connected to each other mechanically, affords advantages in the engagement of the sprags. In this case, both cage ring and supporting ring, which are movable in relation to each other, lead to a synchronization of the engagement movement of the sprags.

The invention also relates to an e-bike drive consisting of a drive shaft with a bottom bracket, a sprocket, and a crankset, the drive shaft being connected via a freewheel to a gearwheel which, for its part, is attached via a reduction gearing to an electric motor, the freewheel having a freewheel cage which is fitted consecutively in the circumferential direction both with bearing rollers and with sprags, and the sprag springs are loaded in the cranking direction, the freewheel cage having at least one axially projecting protrusion which engages in a form-fitting manner in an axially adjacent bearing disk fixed in the axial direction, and is rotatable in relation thereto, but is locked in the axial direction. By means of this design of the freewheel cage, the overall length in the axial direction is shortened and, accordingly, the crankset can be constructed narrower in the axial direction.

BRIEF DESCRIPTION OF THE DRAWINGS

Further details and features of the invention emerge from the description below of four exemplary embodiments with reference to the drawings, in which.

DETAILED DESCRIPTION

Figure 1:
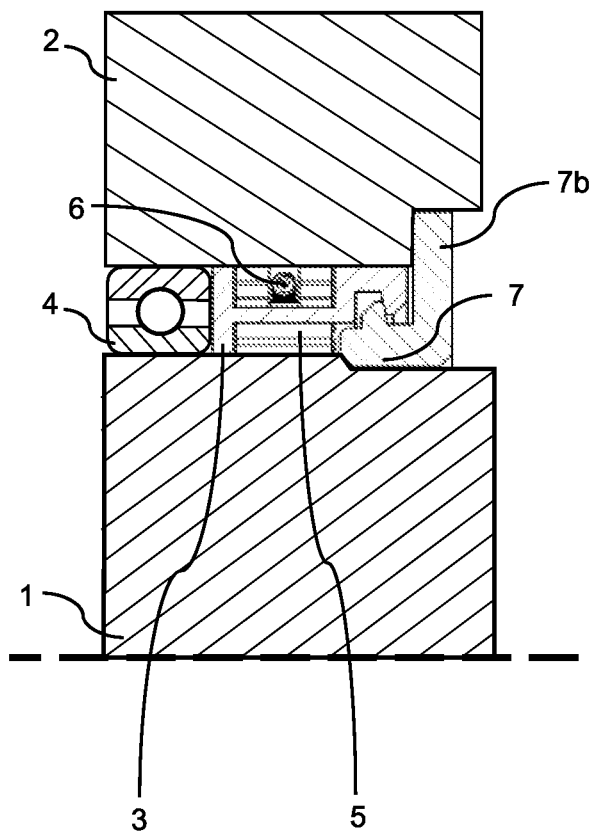
FIG. 1 shows a shaft and hub arrangement with a cage freewheel which is installed in the clamping gap between a shaft and a hub, and with a rolling contact bearing on one side, in radial section.
Figure 5:
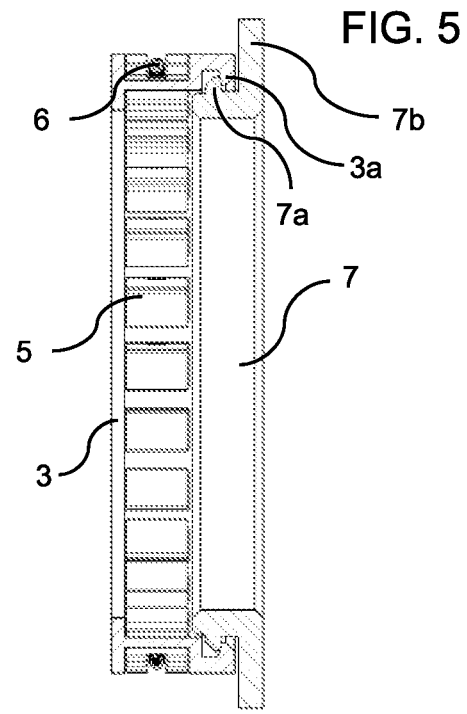
FIG. 5 shows the cage freewheel from FIG. 4 in a radial section.
Figure 6:
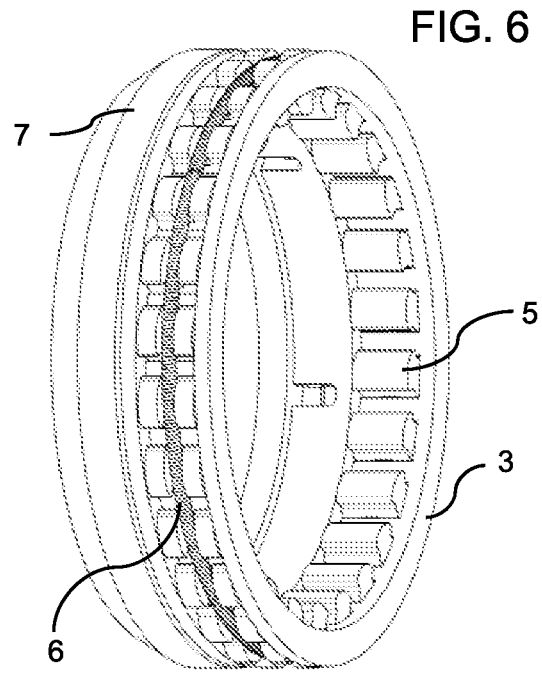
FIG. 6 shows a third exemplary embodiment of a cage freewheel with a latched bearing disk in a radial bearing embodiment in a perspective view.
Figure 7:
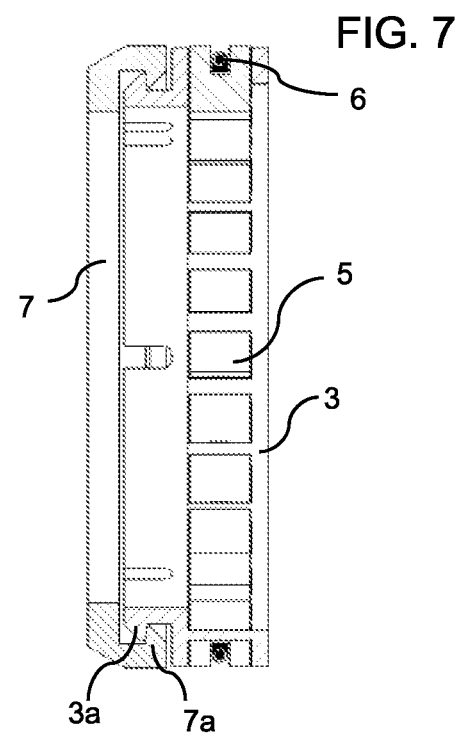
FIG. 7 shows the cage freewheel from FIG. 6 in a radial section.

FIG. 1 shows a shaft and hub arrangement with a hub 2, a shaft 1 which is rotatable relative thereto with a cage freewheel 3 arranged in the clamping gap between shaft and hub (see FIGS. 5 and 6). The bearing disk 7 which is connected rotatable to the cage freewheel 3 but axially rigidly to the hub 2 is inserted into a corresponding receptacle of the hub 2 and is mounted in a sliding manner in relation to the shaft. Furthermore, in this example, the bearing disk permits an axial mounting of the cage freewheel in order therefore to secure the sprag cage against tilting, by locking in the axial direction. In this embodiment, the radial mounting is formed by the interaction of rolling contact bearing 4 and bearing disk 7. Despite the use of only one rolling contact bearing 4, mounting of the cage freewheel on both sides is therefore obtained via the rolling contact bearing 4 and the bearing disk 7.

Figure 2:
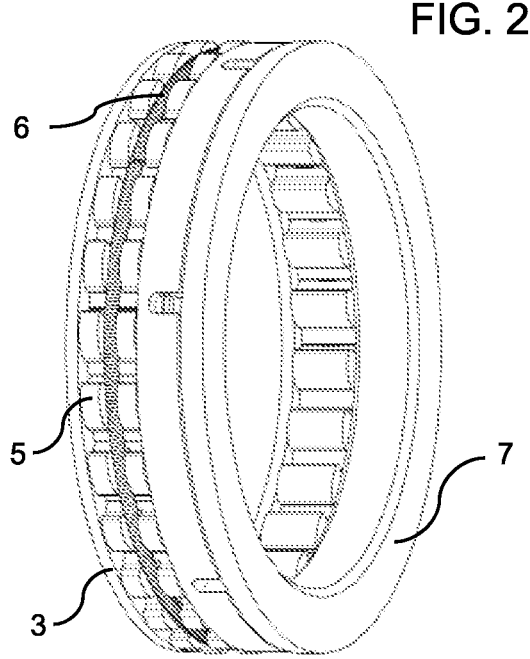
FIG. 2 shows a first exemplary embodiment of a cage freewheel with a latched bearing disk in a radial bearing embodiment in a perspective view.

FIG. 2 shows a cage freewheel which has a sprag cage 3 in the form of a flat cylindrical ring with a multiplicity of pockets which are consecutive in the circumferential direction. The cage freewheel is arranged between a shaft part and a hub part (not shown in this illustration). Sprags 5 are inserted into the pockets of the sprag cage 3. The sprags 5 can carry out a slight tilting movement in a manner known per se in their pockets and can thereby bring about a transmission of torque between the shaft part and the hub part in the blocking direction. In order to transmit high torques, the sprag cage 3 is fitted with as many sprags 5 as possible.

The sprags 5 of a sprag freewheel, which are frequently also referred to as clamping pieces, are, owing to the design, noncircular, i.e. have a long and a short direction of transverse extent. In their long transverse extent, the sprags are designed such that they clamp upon engagement in the annular gap formed by the outer surface of the shaft part and the inner running surface of the hub part.

So that the sprags 5 reliably engage, they are loaded or pretensioned in the engagement direction by an annular encircling spring ring 6, here in the form of a spiral spring placed in the circumferential direction about the row of sprags. For this purpose, the sprags have, on their outer contour surface, an encircling groove into which the spring ring 6 is placed.

The invention would also be able to be realized with other cage constructions, for example with clamping pieces spring-mounted individually or spring-mounted with an encircling sheet metal spring.

Figure 3:
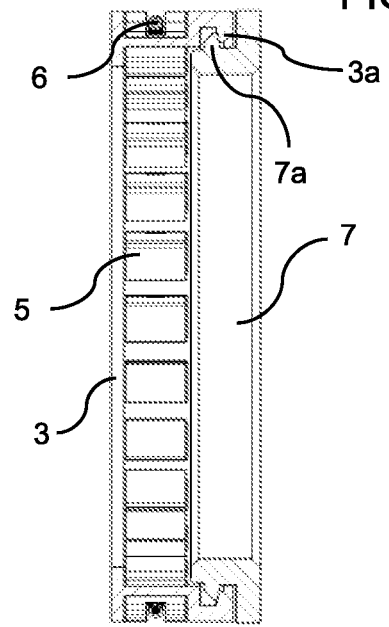
FIG. 3 shows the cage freewheel from FIG. 2 in a radial section.

The sprag cage 3 has, on a side edge, an axially and radially projecting first latching element 3a which is hook-shaped in profile (see FIG. 3). The first latching element 3a corresponds in sections to a second latching element 7a on the bearing disk 7, said latching element 7a forming a recess or an undercut behind which the first latching element 3a can latch and grips therebehind from the outside inward. The two corresponding latching elements 3a, 7a can therefore latch together and form a latching connection between bearing disk 7 and the sprag cage 3, said latching connection intermeshing in a form-fitting manner.

The latching element 3a is in segmented form here, i.e. is interrupted in sections in the circumferential direction. The latching element 3a can thereby snap resiliently more easily into place in relation to the latching element 7a of the bearing disk 7.

The latching element 3a is designed here as a latching hook with a protrusion. The latter is pressed slightly inward, during the mounting of the bearing disk 7, until it latches behind the latching element 7a, which is likewise designed as a latching hook. This embodiment of a latching connection between sprag cage 3 and bearing disk 7 can be mounted in a simple manner, which is advantageous for a multiplicity of applications.

On its outer circumference, the bearing disk forms a sliding surface in relation to the hub part. The function as a radial bearing is thereby provided. Within the scope of the invention, a kinematic reversal of the bearing function, i.e. a sliding mounting in relation to the shaft part, would also be possible.

FIGS. 4 to 9 each show modified exemplary embodiments. To avoid repetitions, only the essential differences over the exemplary embodiment shown in FIG. 2 will be discussed below. Identical or corresponding elements are provided here with the same reference signs.

Figure 4:
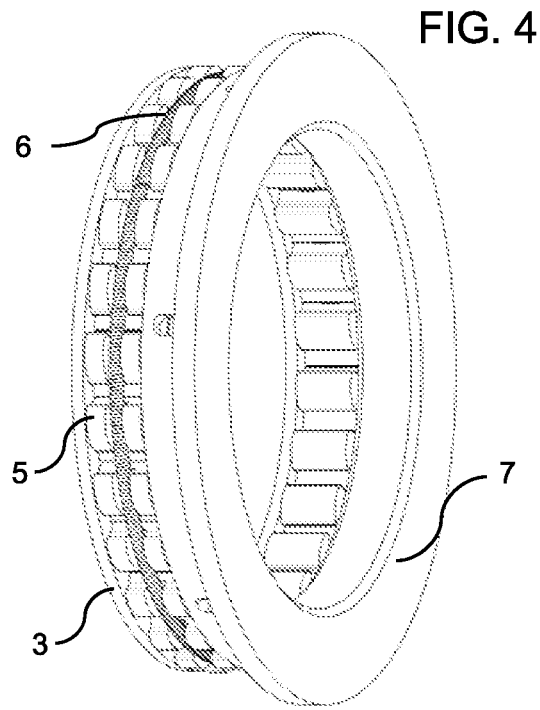
FIG. 4 shows a second exemplary embodiment of a cage freewheel with a latched bearing disk in a radial/axial bearing embodiment in a perspective view.

FIG. 4 shows a further exemplary embodiment of a cage freewheel. It is seen that the bearing disk has a region 7b, which extends in the radial direction, in the manner of a flange (see FIG. 5). The bearing disk 7 can be connected via said flange region 7b to the shaft part in an axially nondisplaceable, and preferably also rotationally fixed manner. In this exemplary embodiment, not only is mounting in the radial direction obtained, but so too is axial mounting, by means of the bearing disk 7.

The latching connection between sprag cage 3 and bearing disk 7 is form-fitting in the axial direction, but rotatable in the circumferential direction. This has the advantage that an effective fixing of the cage ring is produced and no further axial support is necessary.

FIG. 6 shows a further exemplary embodiment of a cage freewheel, in which the bearing disk 7 has the function of a radial bearing. It is essential in this embodiment that the bearing disk 7 has an axially and radially projecting, encircling latching element 3a on a side edge (see FIG. 6). Said latching element 7a corresponds in sections to a latching element 3a of the sprag cage 3 and grips behind said latching element from the inside outward. A latching connection between bearing disk 7 and the sprag cage 3, which latching connection intermeshes in a form-fitting manner, is therefore formed.

The latching element 3a is also in segmented form, i.e. interrupted in sections, on the sprag cage 3 in this case. By this means, the protrusion 7a can snap resiliently into place more easily in relation to the latching element 3a of the sprag cage 3.

The latching element 7a is designed here as a latching hook with a protrusion. During the mounting on the sprag cage 3, the latter presses its segmented latching element 3a slightly inward until it latches behind the latching element 3a, which is likewise designed as a latching hook. This embodiment of a latching connection between sprag cage 3 and bearing disk 7 can be mounted in a simple manner, which is advantageous for a multiplicity of applications. In this example, the bearing disk has an additional bevel which is intended to permit easier mounting.

Figure 8:
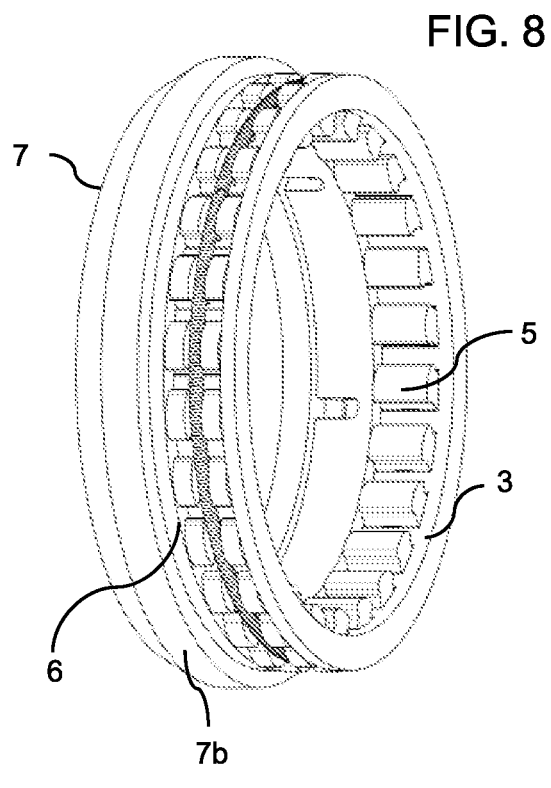
FIG. 8 shows a fourth exemplary embodiment of a cage freewheel with a latched bearing disk in a radial/axial bearing embodiment in a perspective view.
Figure 9:
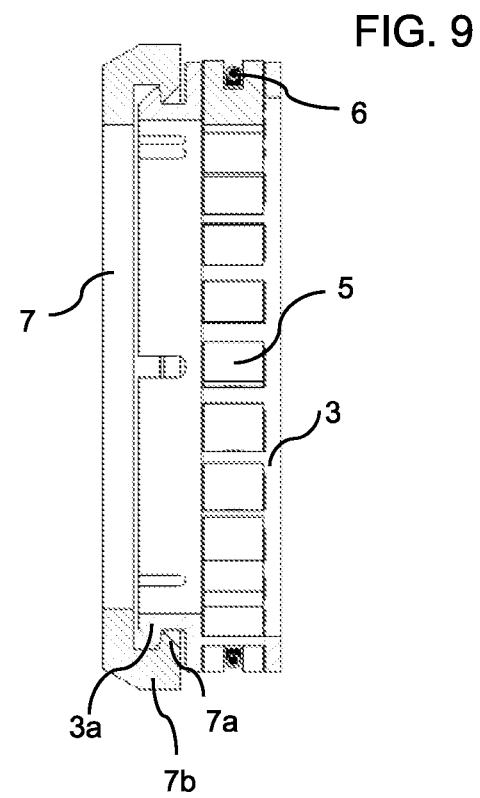
FIG. 9 shows the cage freewheel from FIG. 8 in a radial section.

FIG. 8 shows a further exemplary embodiment of a cage freewheel. It is seen that the bearing disk has a region 7b extending in the radial direction (see FIG. 9) which has an increased outside diameter in relation to the freewheel cage. Since said region of the bearing disk 7 that is of increased diameter is accommodated in a corresponding recess on the hub, the bearing disk 7 can be connected to the hub part in a nondisplaceable, and preferably also rotationally fixed manner. The bearing disk 7 here has the effect of axial mounting in addition to a sliding mounting in the radial direction. As can be seen in the exemplary embodiment in FIG. 6, the bearing disk 7 likewise has an additional bevel for easy mounting.

The latching element 3a of the sprag cage is again in segmented form here, i.e. interrupted in sections. The protrusion 3a can thereby snap resiliently into place more easily in relation to the latching element 3a of the bearing disk 7.

As can be seen in the exemplary embodiment in FIG. 6, the latching element 3a likewise has a latching hook with a protrusion. The latter, during the mounting of the bearing disk, is pressed slightly inward until it latches on the bearing disk 7 behind the latching element 7a, which is likewise designed as a latching hook, and grips behind the latter from the inside outward. This embodiment of a latching connection between sprag cage 3 and bearing disk 7 can be mounted in a simple manner, which is advantageous for a multiplicity of applications.

All of the exemplary embodiments are distinguished by minimal construction space since, by means of the form-fitting connection between cage ring and bearing disk and the design of the bearing disk 7 as a radial and optionally axial plain bearing, a second rolling contact bearing for the mounting of shaft and hub against each other can be dispensed with.

Figure 10:
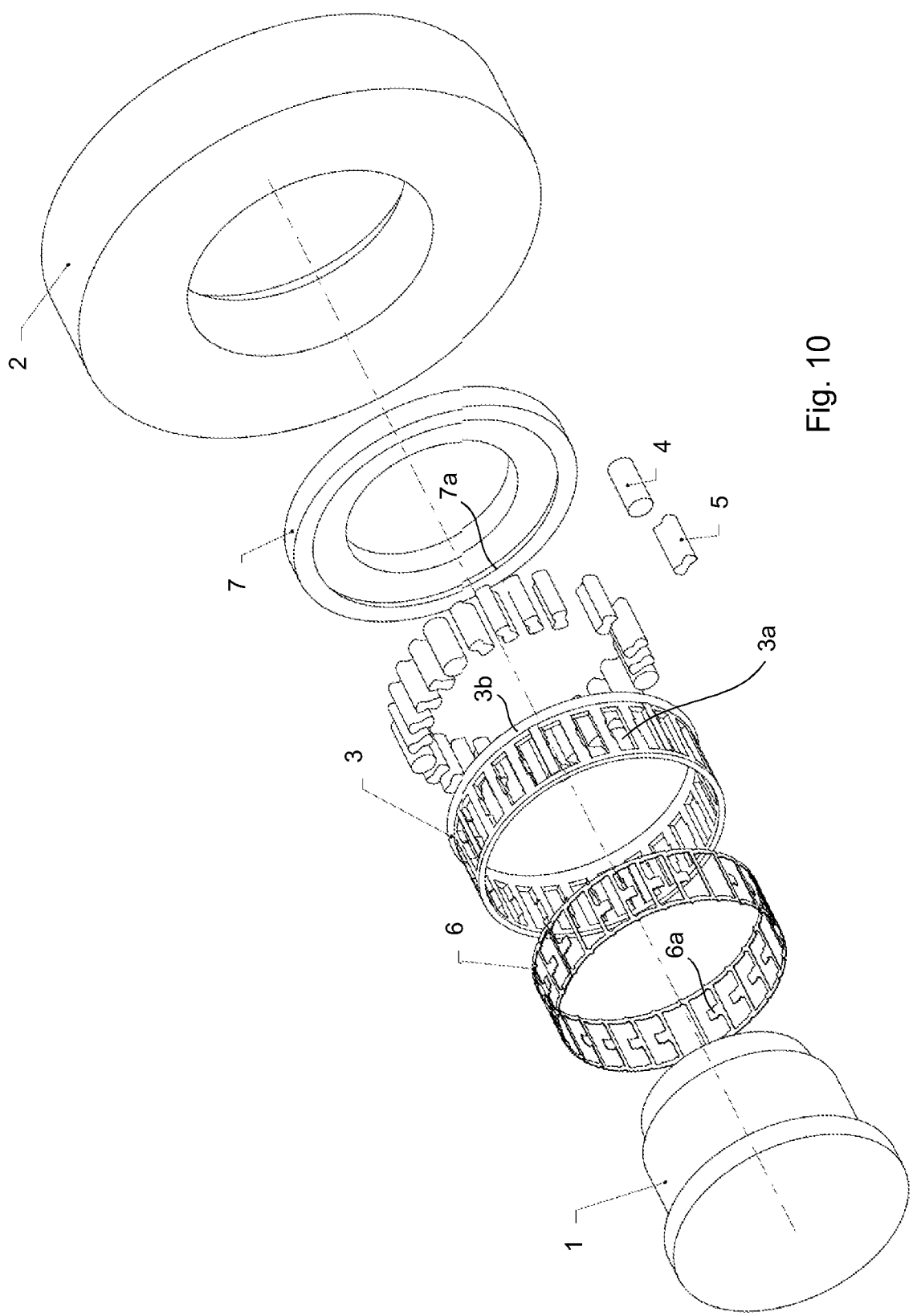
FIG. 10 shows a first variant of a cage freewheel, which is fitted consecutively with sprags and bearing rollers, according to the second embodiment with a separated illustration of its components in a perspective view.

In the second embodiment according to FIG. 10, an inner shaft part 1 and an outer hub part 2 are seen, between which the cage freewheel is intended to be installed. The latter consists of the actual cage ring 3 in the form of a flat cylindrical ring with a multiplicity of windows 3a which are consecutive in the circumferential direction. Cylindrical bearing rollers 4 or sprags 5 can be inserted into the windows 3a. While the bearing rollers 4 take on the function of a roller bearing, the sprags 5 can carry out a slight tilting movement in a manner known per se in their windows and can thereby bring about a transmission of torque between shaft part 1 and hub part 2. In order to transmit high torques, the ring 3 is fitted with as many sprags 5 as possible, while, in the case of the bearing rollers 4, the minimum number of three bearing rollers is frequently sufficient.

So that the sprags 5 reliably engage, they are each loaded in the engagement direction by springs. In the exemplary embodiment, this is undertaken by an annular encircling spring ring 6 which has a spring tongue 6a in each case in the region of the sprags 5.

The sprags 5 of a sprag freewheel, which are frequently also referred to as clamping pieces, are caused by the design to be noncircular, i.e. have a long and a short direction of transverse extent. In their long transverse extent, the sprags are somewhat wider than the diameter of the bearing rollers 4, and therefore they are clamped upon engagement in the annular gap formed by the outer surface of the shaft part 1 and the inner running surface of the hub part 2. In their short direction of transverse extent, the sprags 5 are somewhat narrower than the diameter of the bearing rollers 4, and therefore, when spring-mounted in the engagement direction against the running surfaces of the annular gap, they run along said running surfaces.

Figure 11:
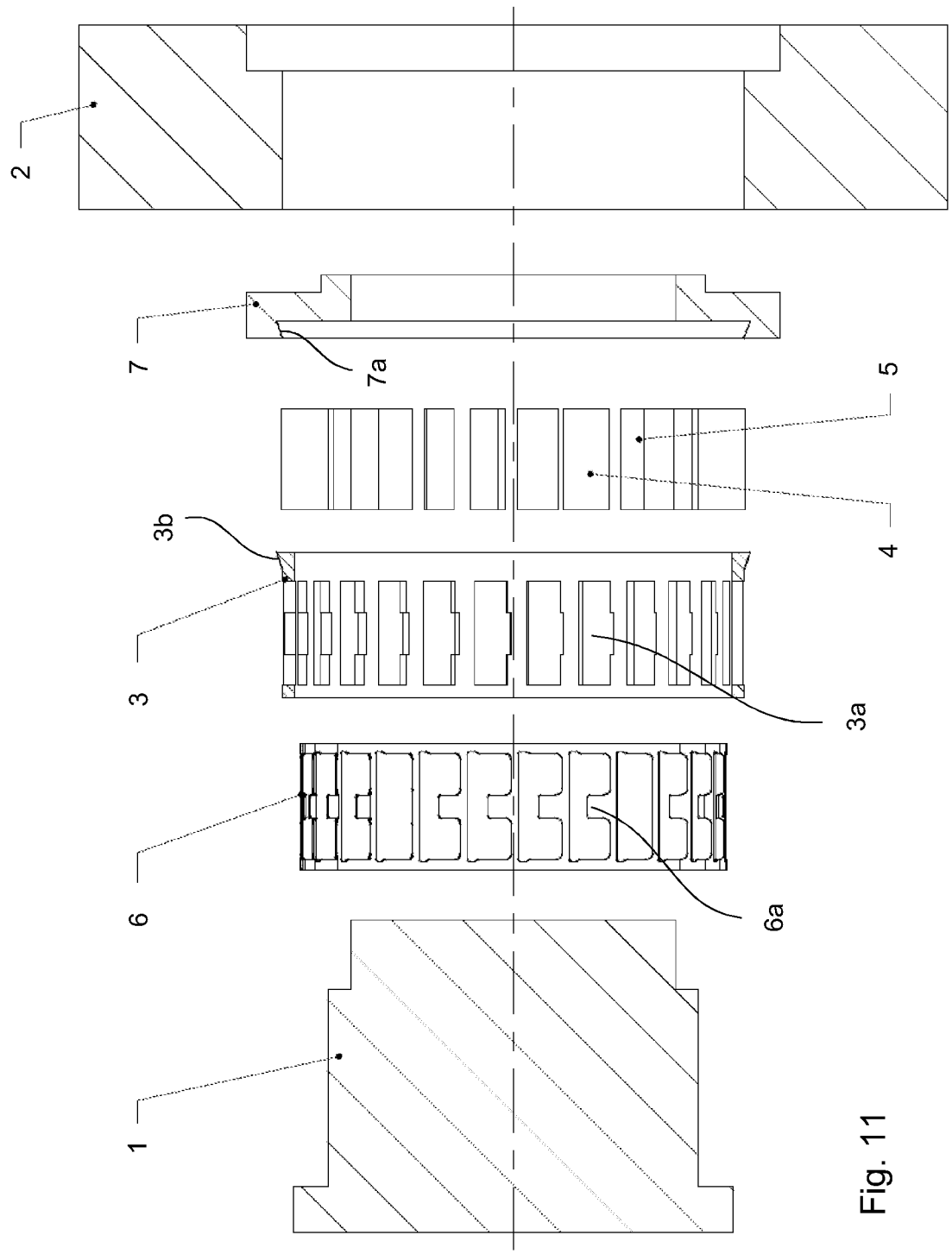
FIG. 11 shows the same components according to FIG. 10 in a radial section.

It is now essential that the cage ring 3 has, on a side edge, an axially and radially projecting, encircling ring 3b (see FIG. 11). Said projecting ring 3b corresponds to a recess 7a in the form of an undercut in an axially adjacent bearing disk 7. Said bearing disk 7 is connected to the hub part 2 in an axially nondisplaceable, and preferably also rotationally fixed manner. On its inner circumference, it forms a sliding surface in relation to the shaft part 1.

Figure 12:
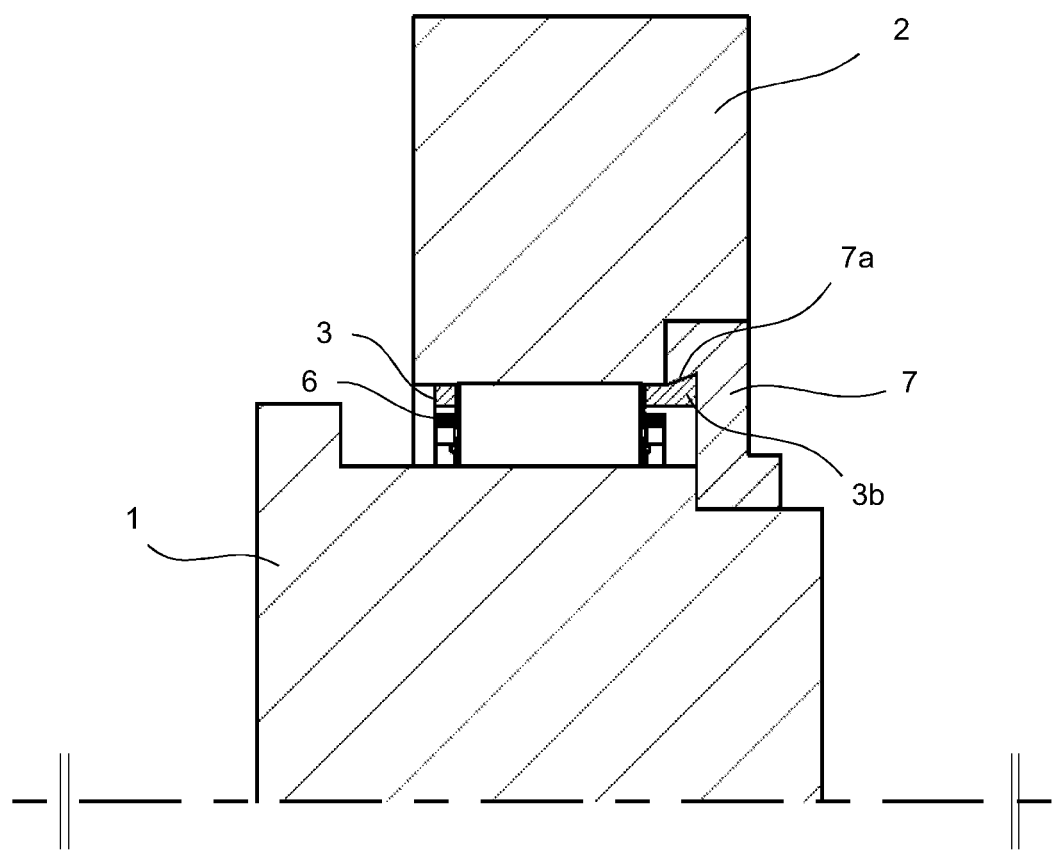
FIG. 12 shows the assembled cage ring according to FIGS. 10 and 11 in a shaft/hub connection.

FIG. 12 shows the cage ring in the installed state. It is seen in particular that the axial protrusion 3b of the cage ring that brings about the undercut is positioned virtually at the outer circumference of the cage ring in such a manner that the spring ring 6 runs inside the cage ring 3.

The form-fitting engagement between the axially and radially protruding protrusion 3b of the cage ring 3, which protrusion engages in a form-fitting manner in the axial direction, but movable in the circumferentially direction, in the recess 7a of the bearing disk 7, which is fixed in the axial direction, has the advantage that an effective fixing of the cage ring in both axial directions is produced, i.e. no further axial support is necessary on the other side of the cage ring.

Figure 13:
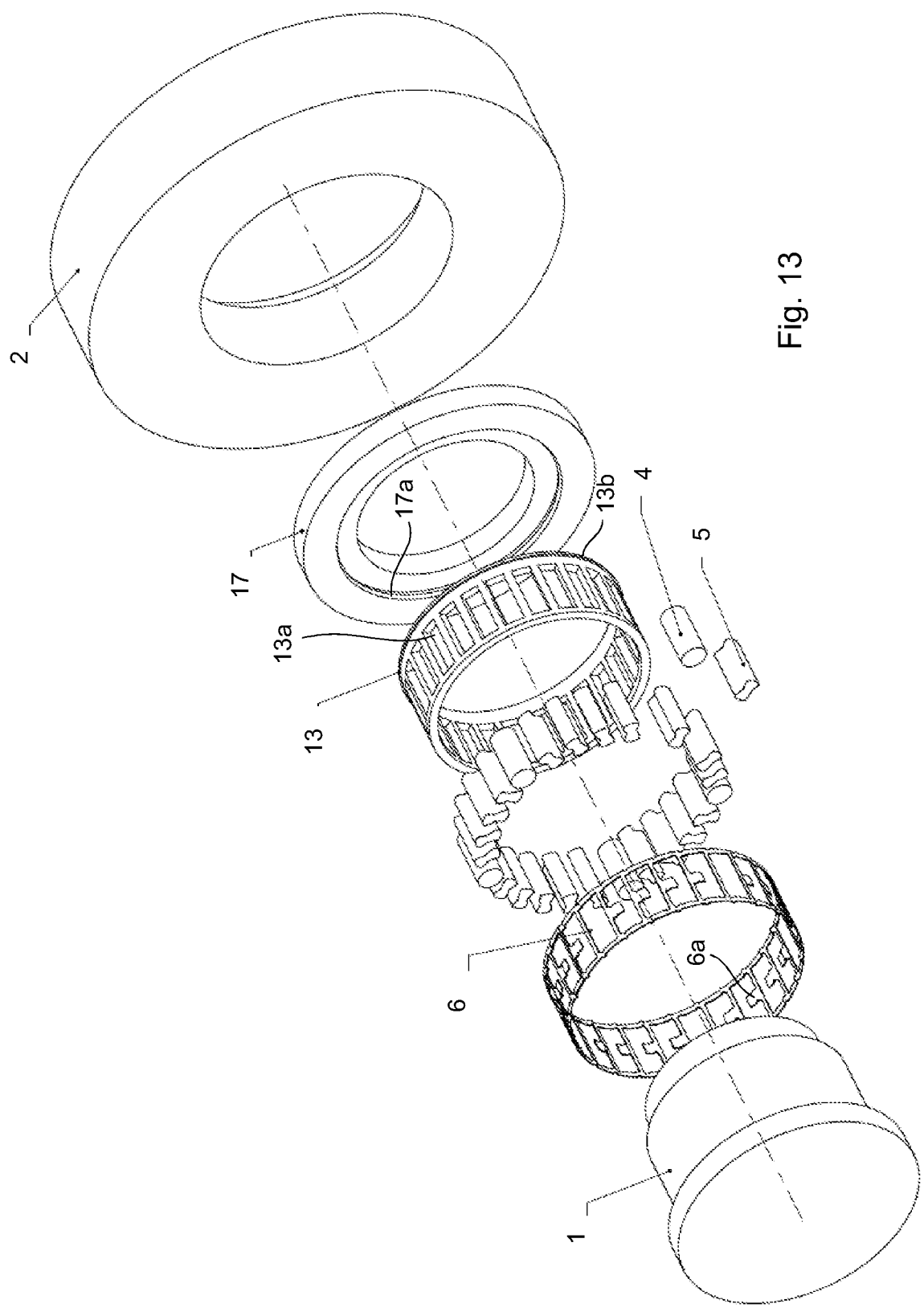
FIG. 13 shows a second variant of a cage freewheel according to the second embodiment with a separated illustration of its components in a perspective view.
Figure 14:
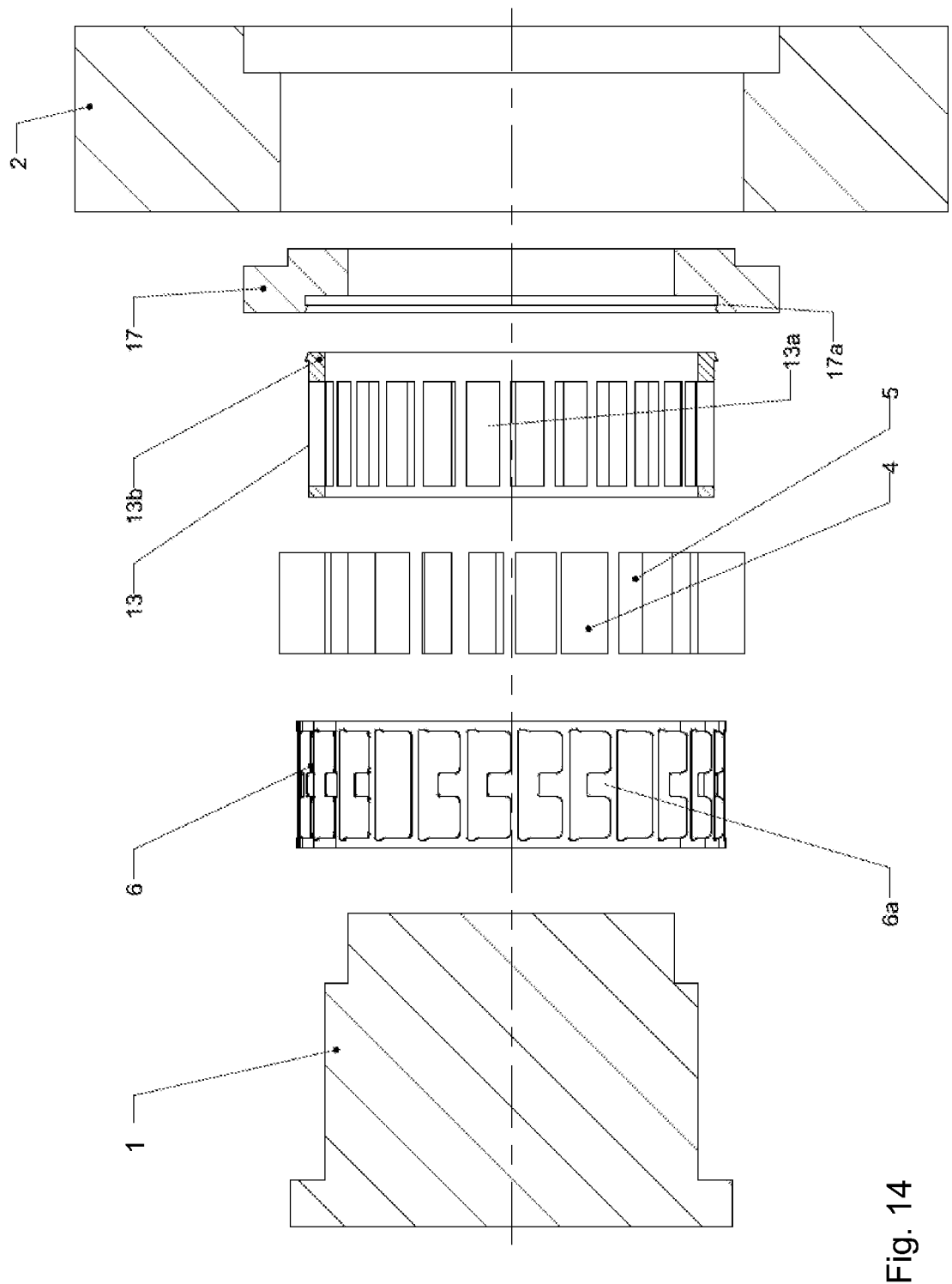
FIG. 14 shows the same components according to FIG. 13 in a radial section.
Figure 15:
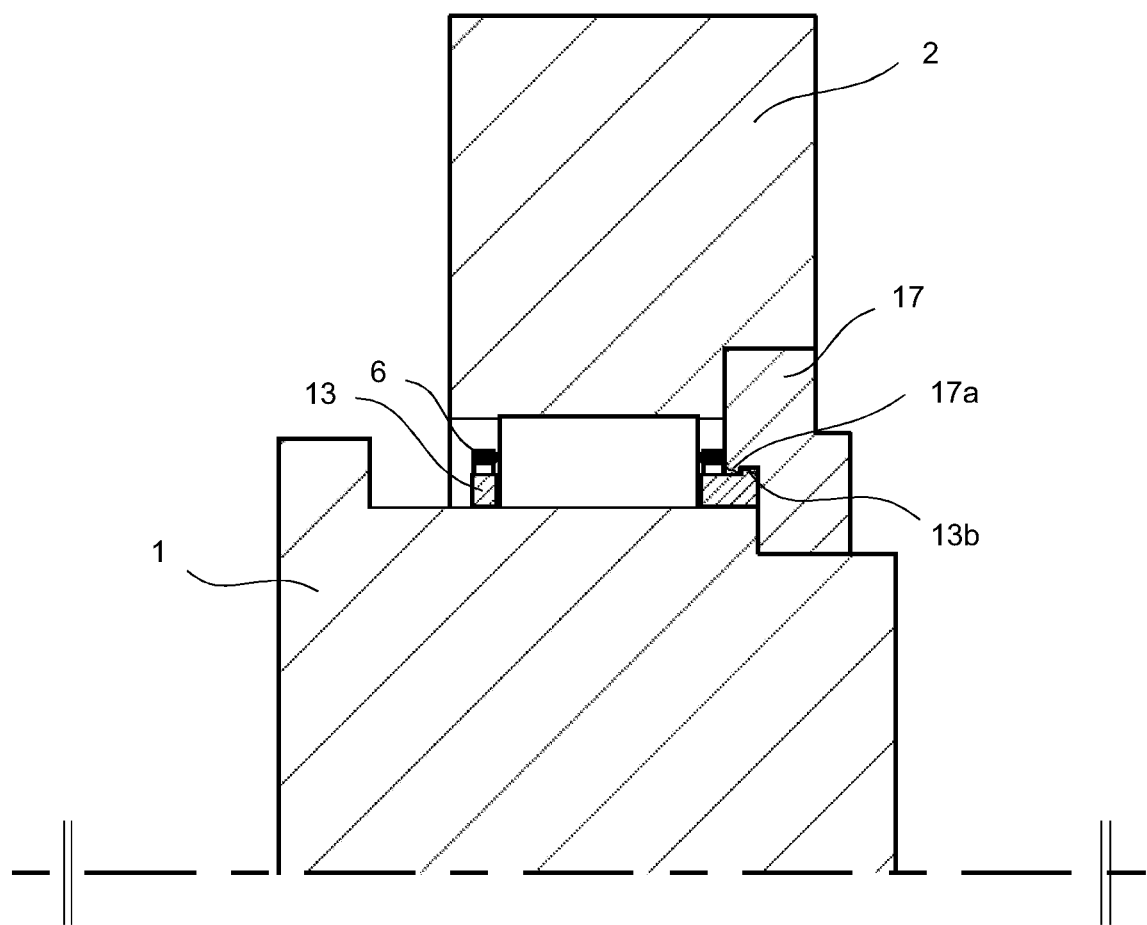
FIG. 15 shows the assembled cage ring according to FIGS. 13 and 14 in a shaft/hub connection.

FIGS. 13 to 15 show a second alternative of the cage ring. It essentially consists of the same parts, only the cage ring 13 and the recess 17a of the bearing disk 17 has a somewhat smaller diameter than in the first alternative. As a result, the cage ring 13 no longer runs on the outside, but rather on the inside of the spring ring 6, see FIG. 15.

Said inner position of the cage ring 13 is appropriate whenever the latter is intended to revolve with the shaft 1, rather than with the hub 2. In this case, the bearing disk 17 can be fixed to the shaft, where it is rotatable on its outer circumference relative to the hub 5.

In addition, in the second exemplary embodiment, the form-fitting engagement between the protrusion 13b and the recess 17a is not designed, as in the first exemplary embodiment, in the form of a dovetail, but rather in the form of a hook. For this purpose, the protrusion 13b has a conically running outer sliding surface, with which it slides along the inner circumference of the recess 17a upon latching into place on a corresponding sliding surface. The protrusion 13b which is designed in the manner of a latching hook is pressed slightly inward here until it latches into place behind the undercut formed by the recess 17a. This embodiment of a latching connection between cage ring 13 and bearing disk 17 is easier to mount and more difficult to dismount than the connection in the first exemplary embodiment, and this is advantageous for a multiplicity of applications.

FIGS. 16 to 18 and 19 to 21 describe a third and fourth alternative for the design of the cage ring. It differs from the previously described examples only in that it does not function with a single cage ring 3 or 13, but also with an additional supporting ring 23 or 33. Said supporting ring 23 or 33 is constructed similarly to the cage ring 3 or 13, i.e. in particular it contains the windows 23a or 33a necessary for receiving the bearing rollers and sprags. Said supporting ring assists the captive holding of the sprags 5 and bearing rollers 4 in the cage ring 3 or 13 and brings about a synchronization of the engagement movement of the sprags 5.

Figure 16:
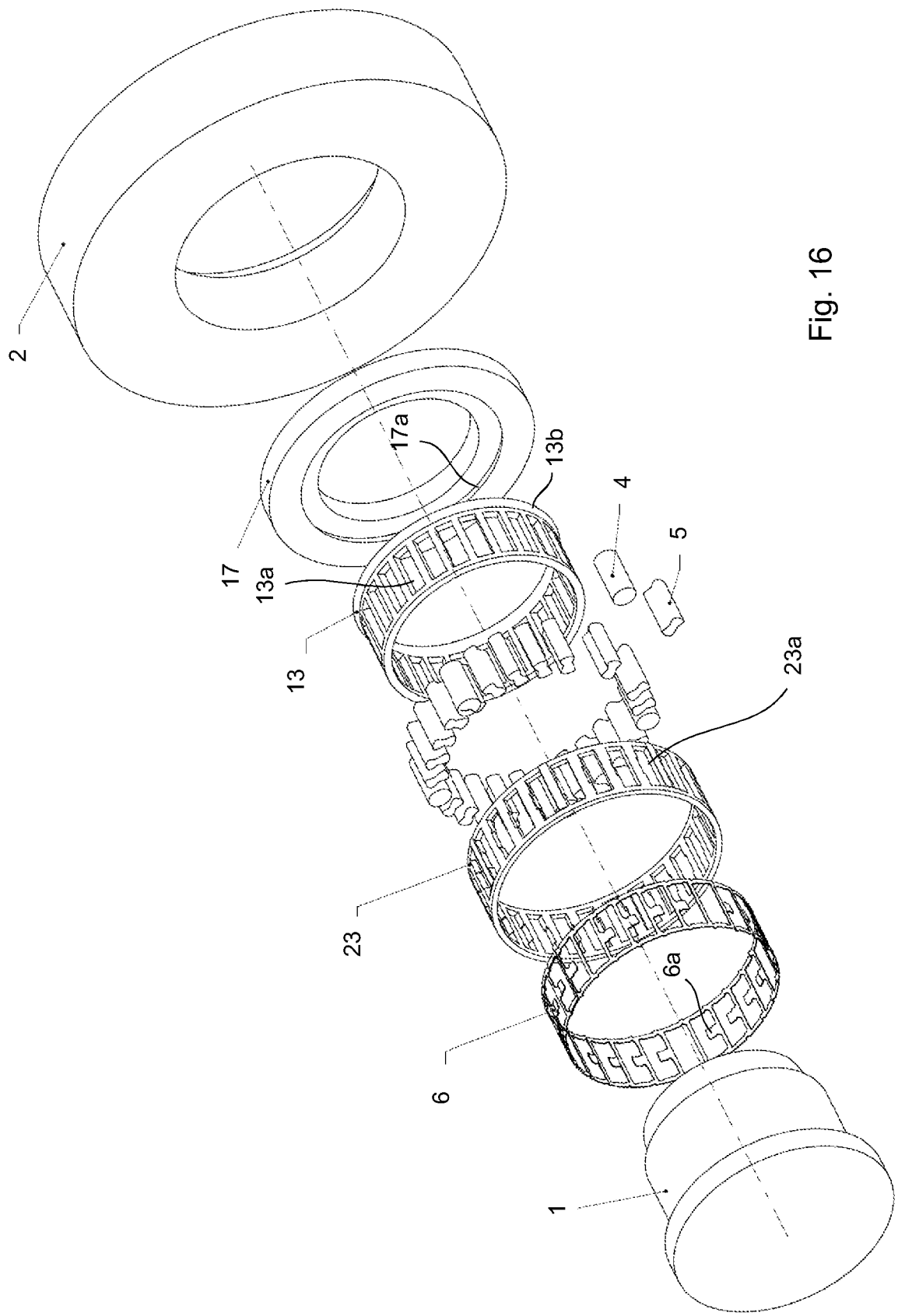
FIG. 16 shows a third variant of a cage freewheel according to the second embodiment with a separated illustration of its components in a perspective view.
Figure 17:
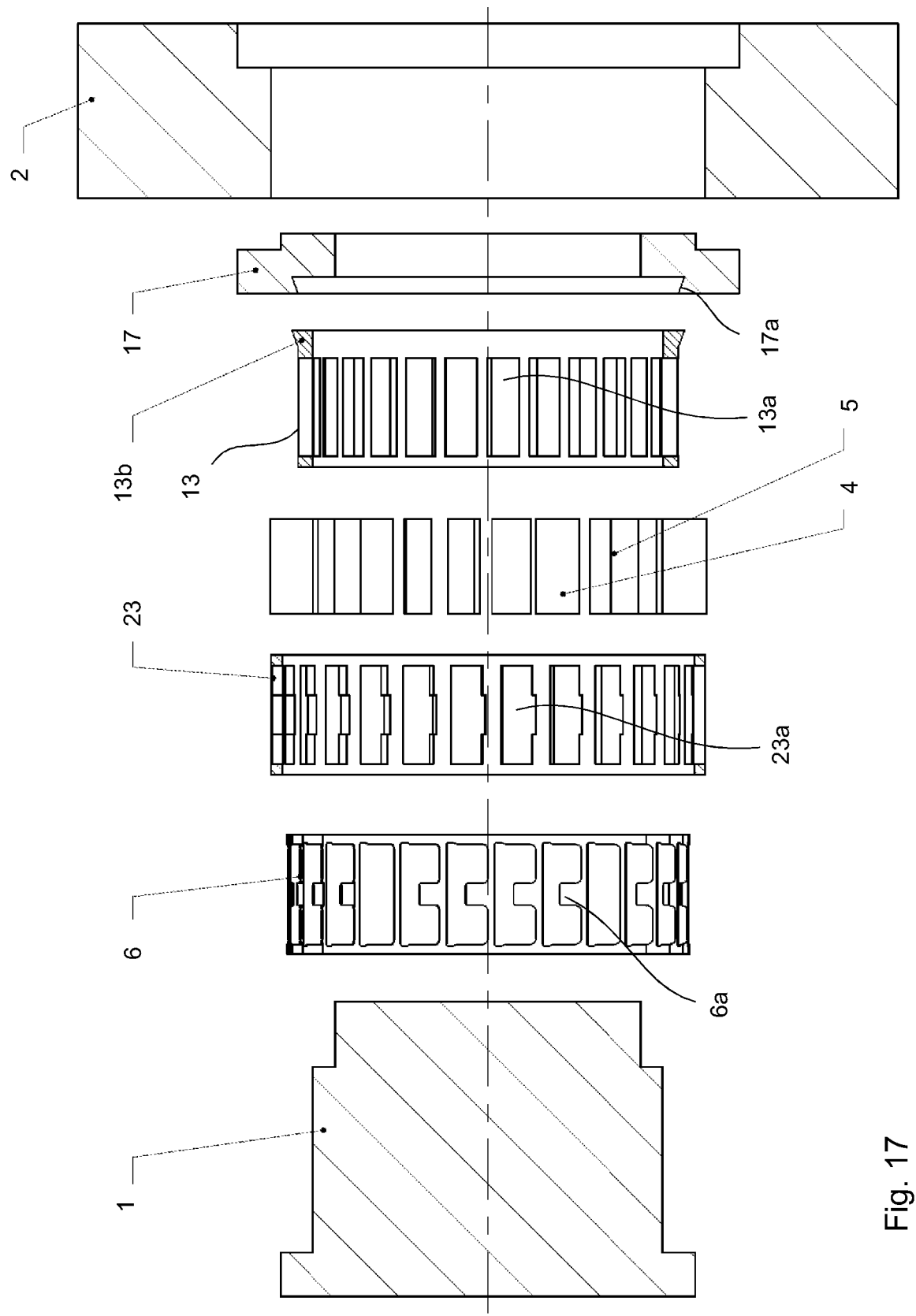
FIG. 17 shows the same components according to FIG. 16 in a radial section.
Figure 18:
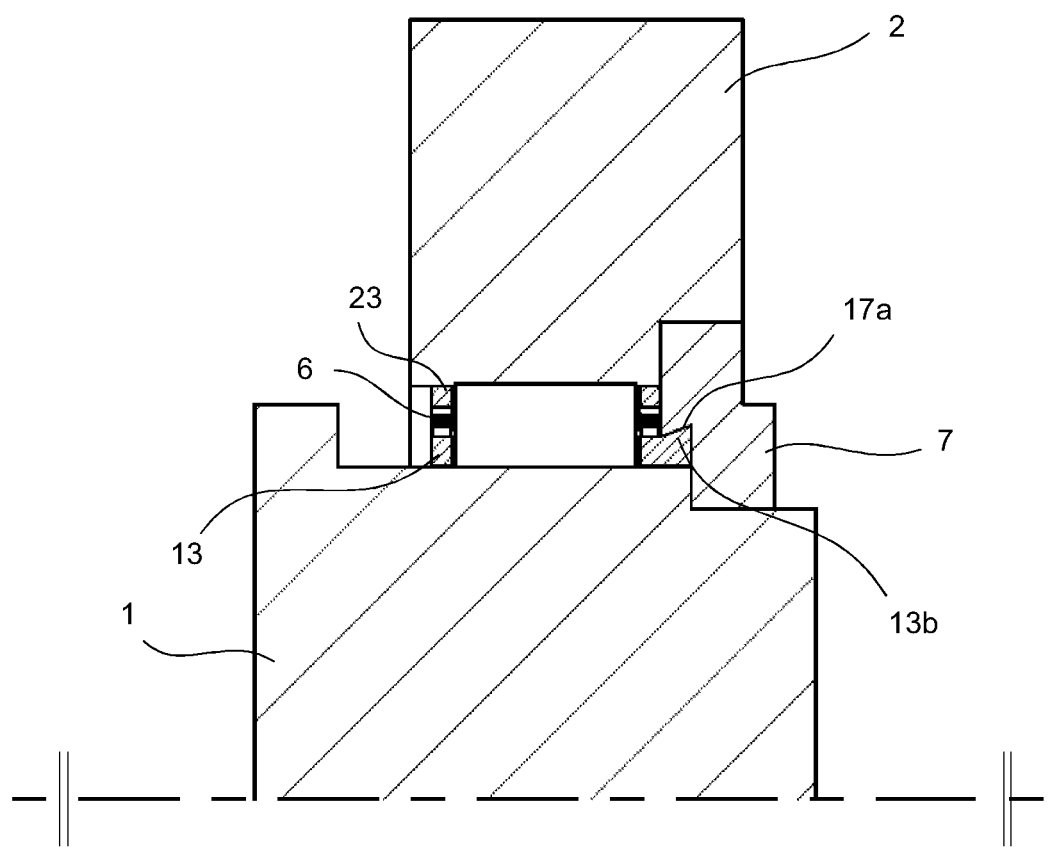
FIG. 18 shows the assembled cage ring according to FIGS. 16 and 17 in a shaft/hub connection.
Figure 19:
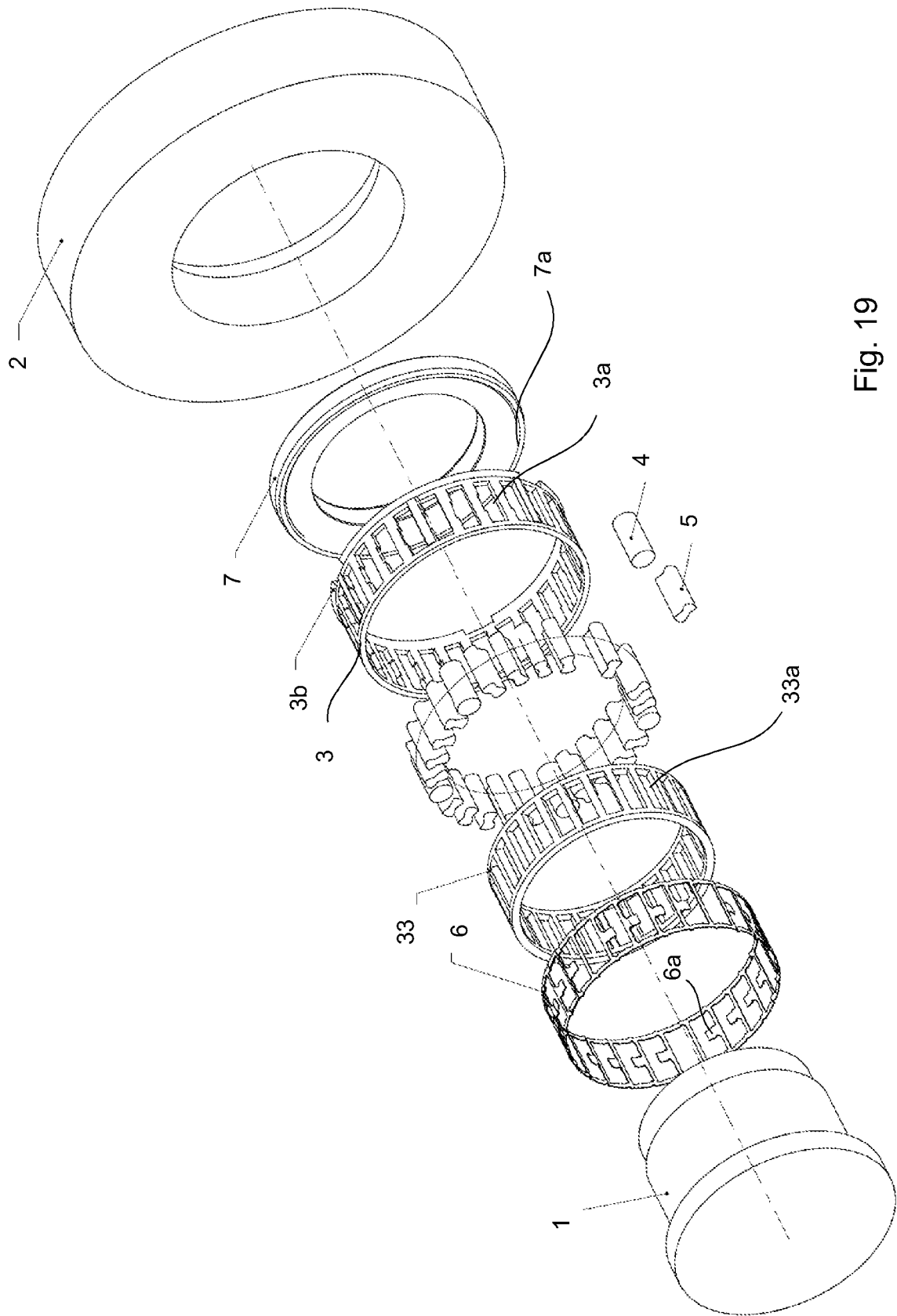
FIG. 19 shows a fourth variant of a cage freewheel according to the second embodiment with a separated illustration of its components in a perspective view with a protrusion in segmented form on the cage ring.
Figure 20:
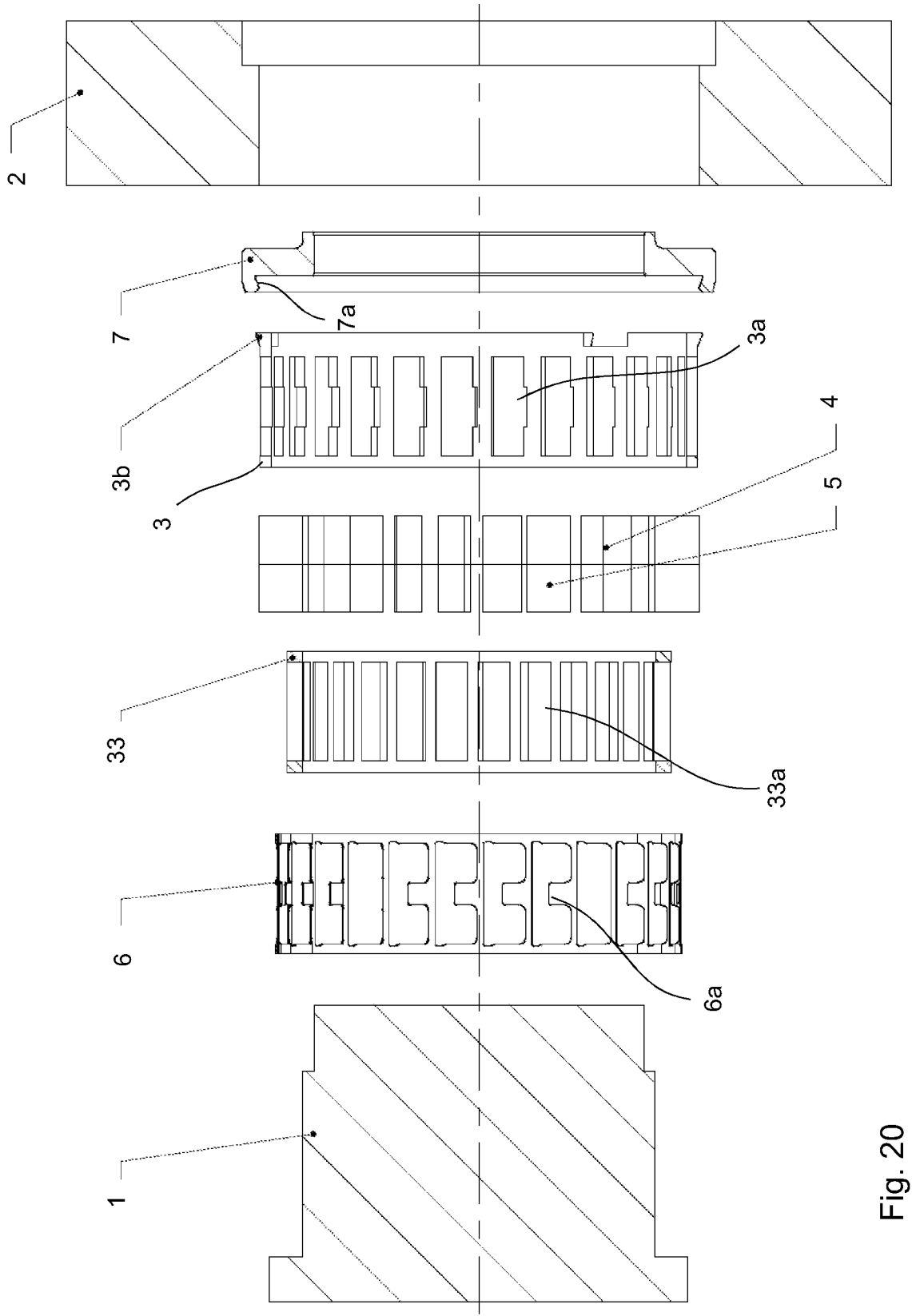
FIG. 20 shows the same components according to FIG. 19 in a radial section.
Figure 21:
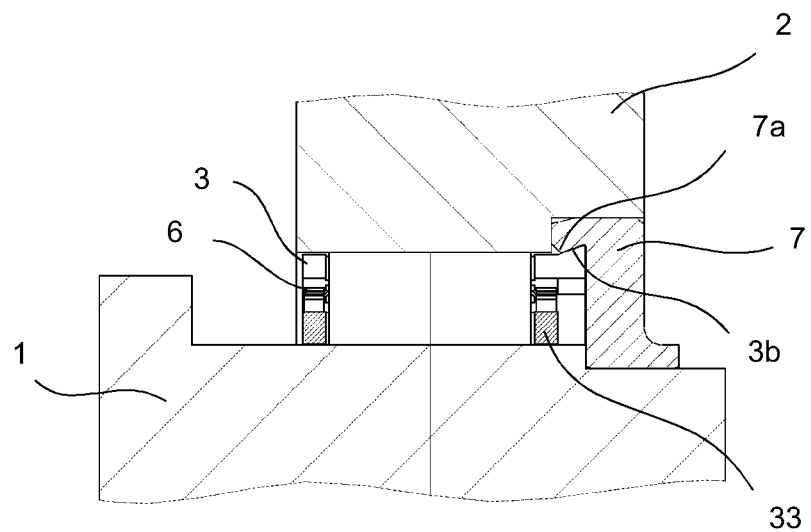
FIG. 21 shows the assembled cage ring according to FIGS. 19 and 20 in a shaft/hub connection.

In the design according to FIGS. 16 to 18, the supporting ring 23 is arranged outside the cage ring 3, whereas the supporting ring 33 in the design according to FIGS. 19 to 21 is arranged inside the cage ring 13, see in particular FIGS. 18 and 21.

In both cases, the spring ring 6 is arranged between the cage ring 3 or 13 and the supporting ring 23 or 33.

The cage ring 3 or 13, the spring ring 6 and also the supporting ring 23 or 33 can be composed of metal or plastic.

It also lies within the scope of the invention to work not with closed rings, but rather with open, radially elastic rings.

As can be seen in FIG. 19, in the exemplary embodiment shown there the protrusion 3b on the cage ring 3 is designed as a segmented ring, i.e. ring which is interrupted in sections. The protrusion 3b can thereby snap resiliently into place more easily in relation to the recess 17a on the bearing disk 17.

Figure 22:
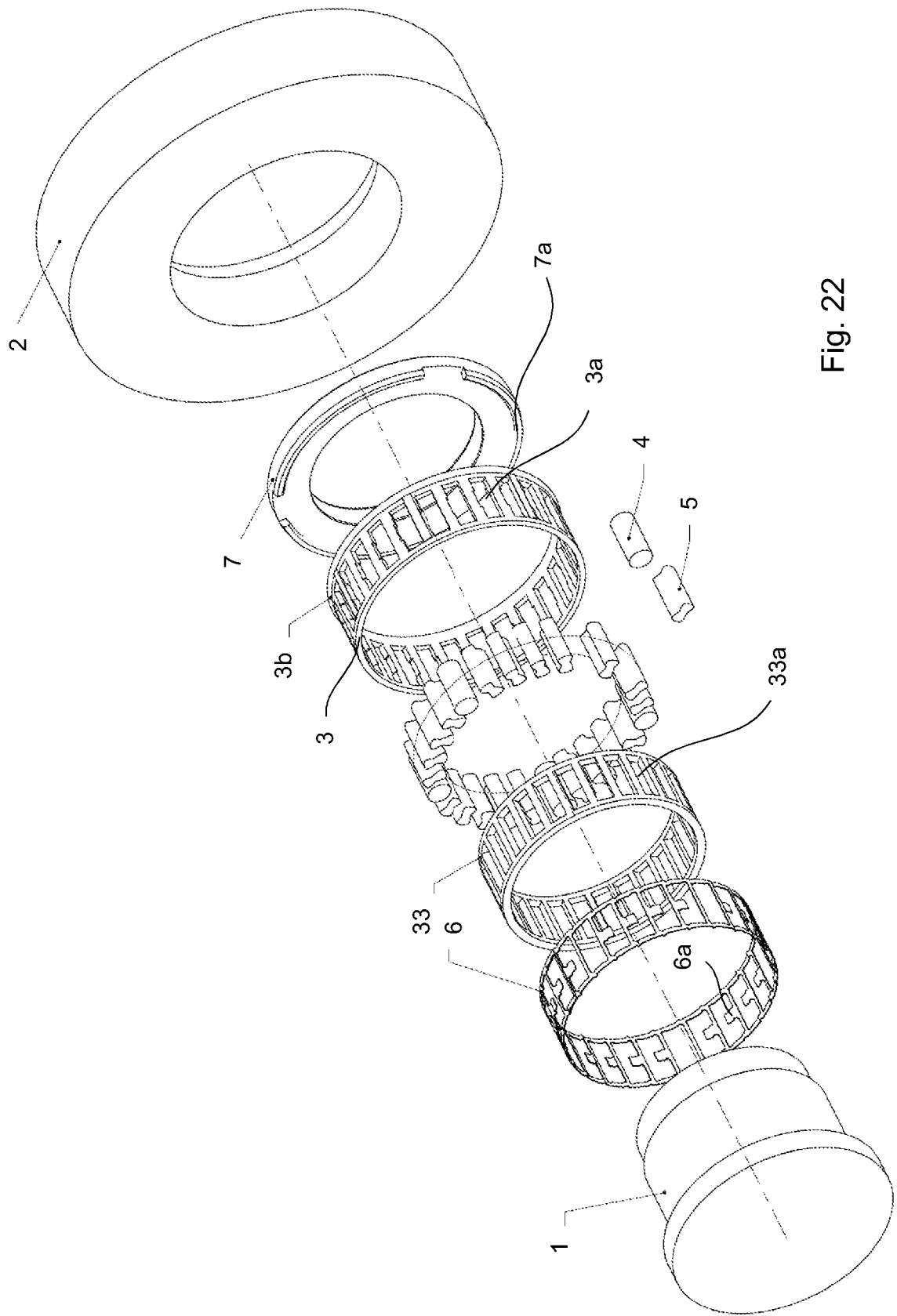
FIG. 22 shows a modification of the fourth variant with a segmented recess on the bearing disk.

In the variant shown in FIG. 22, instead of the protrusion 3b on the cage ring 3, the recess 17a on the bearing disk 17 or a projecting edge of the bearing disk 17 forming the undercut, is in segmented form, i.e. is interrupted in sections, while the protrusion 3b is designed as in FIG. 10 as a continuous ring. As explained, the recess 17a which is undercut in segmented form has advantages in terms of production when the bearing disk 17 is produced as a sintered part or injection molded part.

Figure 23:
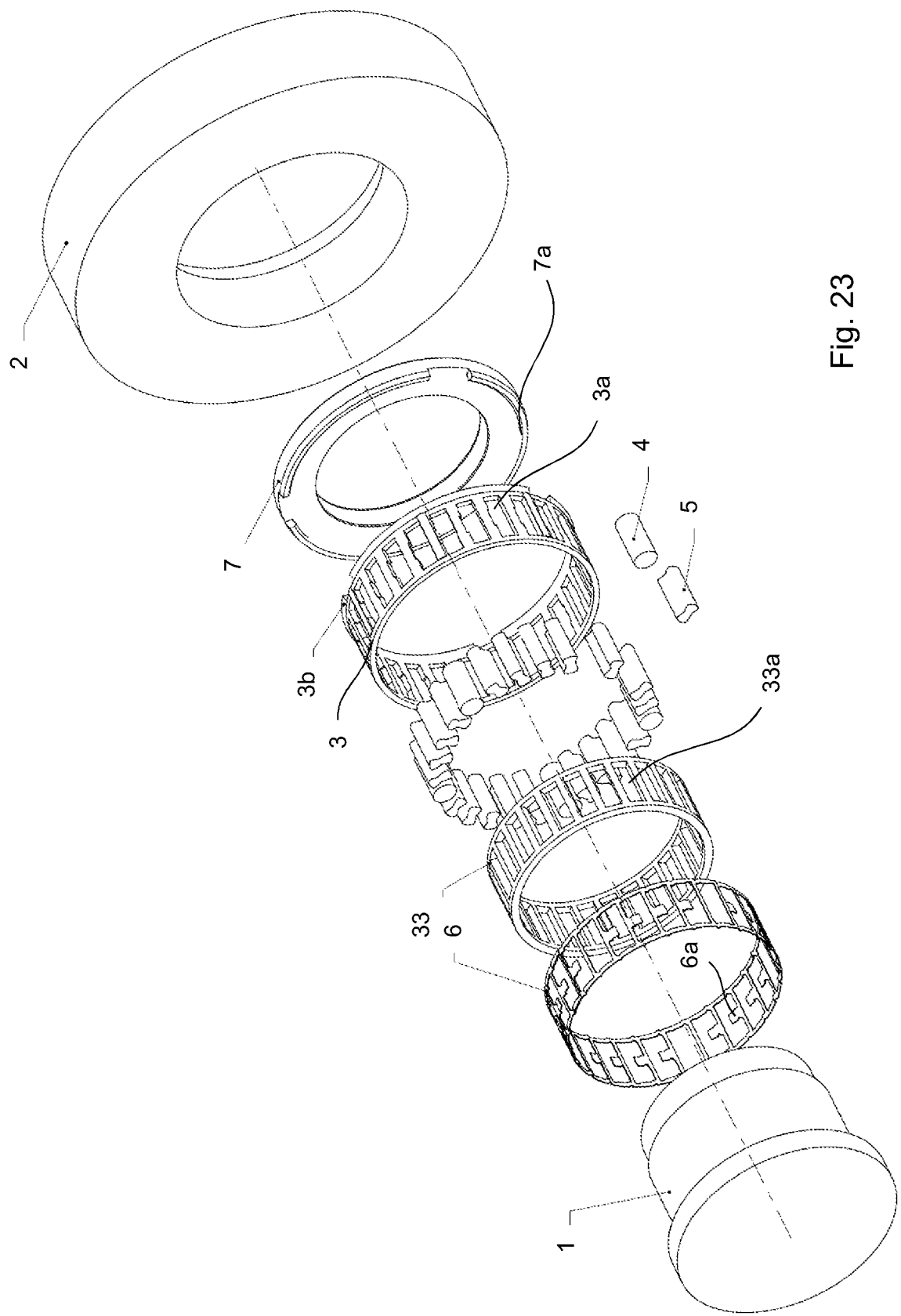
FIG. 23 shows a further modification of the fourth variant, in which both the protrusion on the cage ring and the recess on the bearing disk are in segmented form.

Finally, FIG. 23 illustrates a combined variant in which both the protrusion 3b on the cage ring 3 and the recess 17a on the bearing disk 17 are in segmented form.

All of the exemplary embodiments are distinguished by minimal construction space since, because of the form-fitting connection between cage ring and bearing disk, no further axial securing of the freewheel is required.

Figure 24:
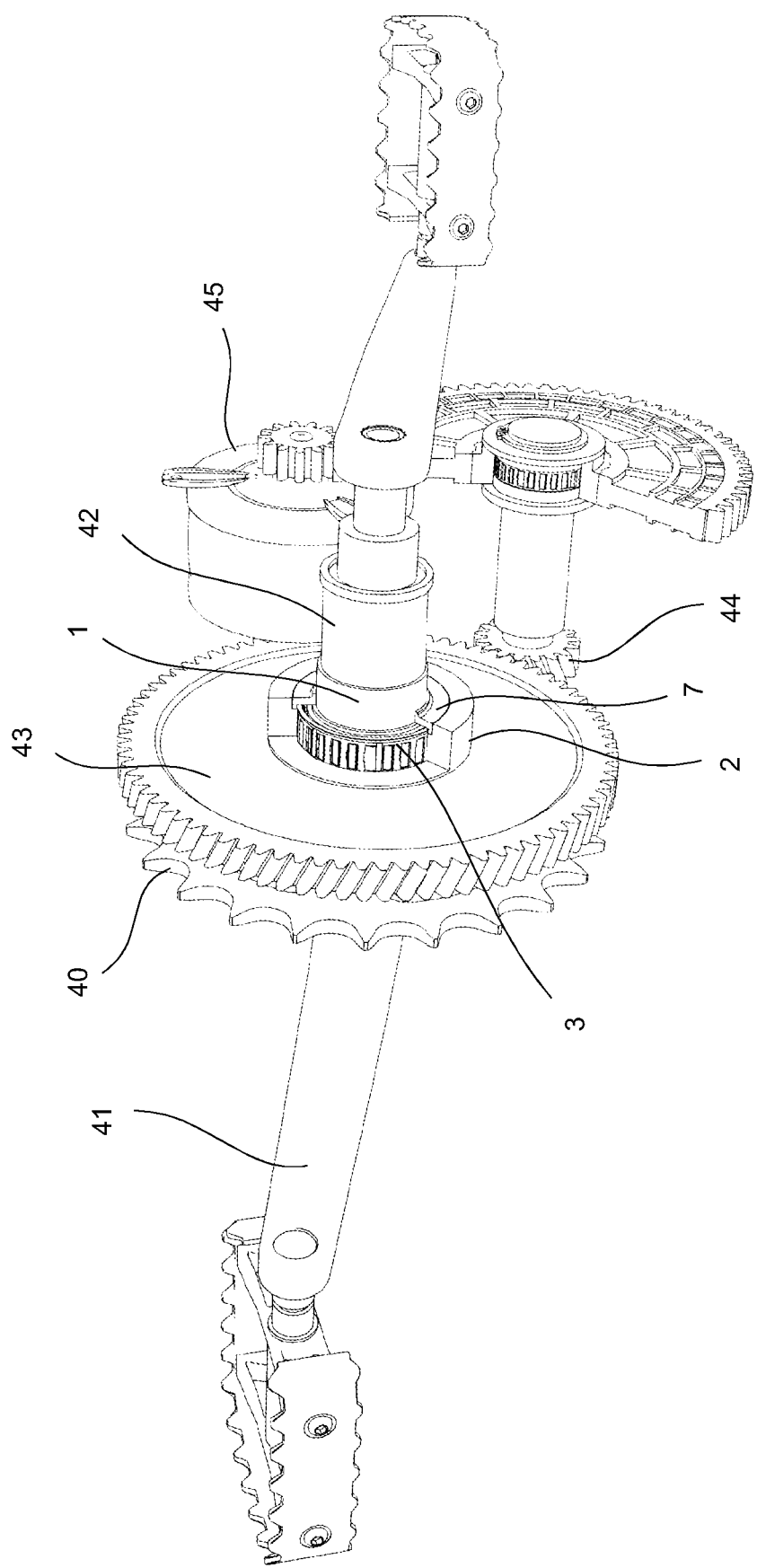
FIG. 24 shows an e-bike drive which is fitted with the cage freewheel according to FIGS. 10 to 23.

FIG. 24 shows an e-bike drive with the housing removed. It shows the drive shaft 1, frequently also referred to as bottom bracket shaft, which is connected rigidly to a sprocket 40 and a bottom bracket set 41 consisting of two end cranks with pedals.

A bottom bracket 42 via which the drive shaft is mounted in the frame of the bicycle is also seen.

In addition, the bottom bracket shaft 1 is drivable by an electric motor 45 via a helically toothed gearwheel 43 and a reduction gearing 44.

For this purpose, the gearwheel 43 is connected to the hub part 2 from FIGS. 10-12 and, with said hub part 2, surrounds the cage freewheel 3 described in FIGS. 10-12. The bearing disk 7 which is connected rotatably, but axially rigidly to the cage freewheel 3 is pressed into the corresponding receptacle in the hub part 2 and mounted in a sliding manner in relation to the bottom bracket shaft 1.

The invention claimed is:

1. A cage freewheel for installing in a clamping gap between a shaft and a hub, the cage freewheel comprising:
    a sprag cage (3) which is configured to fit in a circumferential direction in the clamping gap;
    sprags (5) arranged pivotably in the sprag cage (3), with the sprags (5) being loaded resiliently in an engagement direction;
    a bearing disk (7) arranged axially adjacent to the sprag cage (3); and
    the bearing disk (7) and the sprag cage (3) are connected via a latching connection intermeshing at least in sections with a form-fit.

2. The cage freewheel as claimed in claim 1, wherein the sprag cage (3) is continuously fitted in the circumferential direction with the sprags (5) arranged pivotably in the sprag cage (3).

3. The cage freewheel as claimed in claim 2, wherein the bearing disk (7) is configured to be fixed to the shaft or hub and is rotatable in relation to a respective other of the shaft or the hub.

4. The cage freewheel as claimed in claim 2, wherein the bearing disk (7) comprises a plain bearing.

5. The cage freewheel as claimed in claim 2, wherein the sprags (5) are mounted captively in the sprag cage (3).

6. The cage freewheel as claimed in claim 1, wherein the bearing disk (7) is rotatable relative to the sprag cage (3) and is locked in an axial direction.

7. The cage freewheel as claimed in claim 1, wherein the latching connection has a dovetail-shaped, hook-shaped or mushroom-shaped latching profile extending in the circumferential direction.

8. The cage freewheel as claimed in claim 7, wherein the latching profile comprises a concentric and continuous ring or ring that is interrupted in sections.

9. The cage freewheel as claimed in claims 7, wherein the latching connection has a recess which is formed in the bearing disk (7) and runs continuously in the circumferential direction of the bearing disk (7) or is segmented in the circumferential direction.

10. The cage freewheel as claimed in claim 7, wherein the latching profile is formed on the sprag cage (3) and grips behind a recess of the bearing disk (7) radially from an inside outward.

11. The cage freewheel as claimed in claim 1, wherein the sprag cage (3, 13) is fitted consecutively in the circumferential direction with bearing rollers (4) and with sprags (5), and the sprags (5) are loaded resiliently in the engagement direction.

12. The cage freewheel as claimed in claim 11, wherein the spring loading of the sprags (5) is provided via a spring ring (6) which is arranged concentrically with respect to the freewheel cage (3, 13) and loads the sprags (5) in the engagement direction by spring tongues (6a) of the spring ring.

13. The cage freewheel as claimed in claim 11, wherein the bearing rollers (4) and the sprags (5) are mounted captively in the freewheel cage (3, 13).

14. The cage freewheel as claimed in claim 11, wherein the freewheel cage (3, 13) has a concentrically arranged supporting ring (23, 33) configured for additionally mounting the sprags (5) and the bearing rollers (4).

15. A shaft and hub arrangement, comprising:
    a hub (2);
    a shaft (1) which is rotatable relative to the hub;
    a cage freewheel arranged in a clamping gap between the shaft and the hub, the cage freewheel including a sprag cage (3) which is located in a circumferential direction in the clamping gap, sprags (5) arranged pivotably in the sprag cage (3), with the sprags (5) being loaded resiliently in an engagement direction, and a bearing disk (7) arranged axially adjacent to the sprag cage (3);
    on one side adjacent to the cage freewheel there is a rolling contact bearing or plain bearing configured as a radial bearing and via which the shaft (1) and the hub (2) are mounted against each other; and
    the bearing disk (7) and the sprag cage (3) are connected via a latching connection intermeshing at least in sections with a form-fit.

16. The shaft and hub arrangement as claimed in claim 15, wherein the bearing disk (7) of the cage freewheel is fixed to the shaft (1) or the hub (2) and is rotatable in relation to an other of the shaft or the hub.

17. A cage freewheel for installing in a clamping gap between a shaft and a hub, the cage freewheel comprising:
    a freewheel cage (3) which is configured to fit in a circumferential direction in the clamping gap;
    sprags (5) arranged pivotably in the freewheel cage (3), with the sprags (5) being loaded resiliently in an engagement direction;
    a bearing disk (7) arranged axially adjacent to the freewheel cage (3); and
    the freewheel cage (3, 13) has at least one axially projecting protrusion (3b, 13b) which engages with a form-fit in the axially adjacent bearing disk (7, 17) fixed in an axial direction, and is rotatable in relation thereto, but is locked in an axial direction.

18. The cage freewheel as claimed in claim 17, wherein the at least one axial protrusion (3b, 13b) of the freewheel cage (3, 13) has a dovetail-shaped, hook-shaped or mushroom-shaped cross section and grips radially behind a corresponding recess (7a, 17a) of the bearing disk (7, 17).

19. The cage freewheel as claimed in claim 18, wherein the at least one axial protrusion (3b, 13b) of the freewheel cage (3, 13) comprises a concentric and continuous ring or ring which is interrupted in sections.

20. The cage freewheel as claimed in claim 18, wherein the recess (7a, 17a) in the bearing disk (7, 17) runs continuously in the circumferential direction or is segmented in the circumferential direction.

21. The cage freewheel as claimed in claim 18, wherein the at least one axial protrusion (3b, 13b) of the freewheel cage (3, 13) grips behind the recess (7a, 17a) in the bearing disk (7, 17) radially from an inside outward.

22. The cage freewheel as claimed in claim 17, wherein the bearing disk (7, 17) is fixed to an adjacent shaft part or hub part (1, 2) and is rotatable in relation to an other of the shaft or the hub.

23. The cage freewheel as claimed in claim 22, wherein the bearing disk (7, 17) is mounted rotatable on the shaft part or the hub part (1 or 2) via a rolling contact bearing.

24. The cage freewheel as claimed in claim 17, wherein the bearing disk (7, 17) comprises a plain bearing.

* * * * *